United States Patent
Oogose et al.

(10) Patent No.: US 10,588,302 B2
(45) Date of Patent: Mar. 17, 2020

(54) DUAL-BEARING REEL

(71) Applicant: Shimano Inc., Sakai, Osaka (JP)

(72) Inventors: Hiroki Oogose, Sakai (JP); Takanori Maruoka, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 0 days.

(21) Appl. No.: 16/408,760

(22) Filed: May 10, 2019

(65) Prior Publication Data

US 2019/0387726 A1 Dec. 26, 2019

(30) Foreign Application Priority Data

Jun. 21, 2018 (JP) ................................ 2018-117834

(51) Int. Cl.
*A01K 89/01* (2006.01)
*A01K 89/015* (2006.01)

(52) U.S. Cl.
CPC .... *A01K 89/01921* (2015.05); *A01K 89/0193* (2015.05)

(58) Field of Classification Search
CPC .......... A01K 89/0192; A01K 89/01923; A01K 89/01924; A01K 89/0193
See application file for complete search history.

(56) References Cited

U.S. PATENT DOCUMENTS

| | | | | |
|---|---|---|---|---|
| 5,372,324 A * | 12/1994 | Sato | .................. | A01K 89/0155 242/312 |
| 6,364,230 B1 * | 4/2002 | Kawasaki | .......... | A01K 89/0155 188/181 A |
| 6,474,580 B1 * | 11/2002 | Hirayama | .......... | A01K 89/0155 242/289 |
| 8,235,320 B2 * | 8/2012 | Kawasaki | .......... | A01K 89/0192 242/310 |
| 8,517,299 B2 * | 8/2013 | Nakagawa | ......... | A01K 89/0155 242/289 |
| 2014/0263792 A1 * | 9/2014 | Takechi | ............... | A01K 89/015 242/257 |
| 2015/0076269 A1 * | 3/2015 | Niitsuma | ............. | A01K 89/015 242/249 |
| 2016/0235048 A1 * | 8/2016 | Ikebukuro | ............ | A01K 89/045 |
| 2017/0202192 A1 * | 7/2017 | Niitsuma | ........... | A01K 89/0173 |

FOREIGN PATENT DOCUMENTS

JP 2006-246776 A 9/2006

* cited by examiner

*Primary Examiner* — Emmanuel M Marcelo
(74) *Attorney, Agent, or Firm* — United IP Counselors, LLC

(57) ABSTRACT

A dual-bearing reel includes a reel body, a spool shaft, an operating member, and a cam mechanism. The reel body includes a frame, a cover member disposed on one side of the frame, and a shaft support part fixed inside the cover member and supported by the frame. One end of the spool shaft is supported by the shaft support part. The operating member is integrally movable with the shaft support part in the axial direction and rotatably mounted on the shaft support part to rotate between a first position where the shaft support part is attached to the frame and a second position where the shaft support part is detached from the frame. The cam mechanism moves the shaft support part in the axial direction in accordance with the rotation of the operating member such that the shaft support part is attached to and detached from the frame.

9 Claims, 7 Drawing Sheets

DUAL-BEARING REEL

CROSS-REFERENCE TO RELATED APPLICATIONS

This application claims priority to Japanese Patent Application No. 2018-117834, filed Jun. 21, 2018. The contents of that application are incorporated by reference herein in their entirety.

BACKGROUND

Technical Field

The present disclosure relates to a fishing reel, and particularly to a dual-bearing reel.

Background Information

Conventionally, a dual-bearing reel has been known in which a cover member covering the side of a reel body is detachably attached to a frame of a reel body (refer to Japanese Laid-open Patent Application Publication No. 2006-246776). A support member for supporting one end of a spool shaft is fixed to the cover member.

BRIEF SUMMARY

In the conventional dual-bearing reel, detaching the cover member from the frame required manual movement of the cover member away from the frame after operating a rotating member to release the engagement between the frame and the support member. Furthermore, because the support member is fitted to the frame with high accuracy, the cover member must be moved parallel to the axial direction of the spool shaft when moving the cover member. This is an operation which an operator needs to become accustomed to.

An object of the present disclosure is to easily remove a cover member from a frame of a reel body in a dual-bearing reel.

A dual-bearing reel according to an aspect of the present disclosure includes a reel body, a spool shaft, an operating member, and a cam mechanism. The reel body includes a frame, a cover member disposed on one side of the frame, and a shaft support part fixed inside of the cover member and supported by the frame. One end of the spool shaft is supported by the shaft support part. The operating member is integrally movable with the shaft support part in an axial direction of the spool shaft. The operating member is rotatably mounted on the shaft support part to rotate between a first position where the shaft support part is attached to the frame and a second position where the shaft support part is detached from the frame. The cam mechanism moves the shaft support part in the axial direction in accordance with the rotation of the operating member such that the shaft support part is attached to and detached from the frame.

In this dual-bearing reel, the shaft support part is moved in the axial direction together with the operating member in accordance with the rotation of the operating member by the cam mechanism, whereby the shaft support part is attached to and detached from the frame of the reel body. Thus, for example, even when the shaft support part is fitted to the frame with high accuracy, the shaft support part can be detached from the frame by simply turning the operating member thereby making it possible to easily remove the cover member from the frame.

Preferably, the cam mechanism includes one or more cams disposed on one of the frame or the operating member, and one or more cam followers disposed on the other one of the frame or the operating member to be engaged with the cam.

Preferably, the cam is formed along the circumferential direction, and includes a cam groove having an inclined portion that moves the shaft support part in a direction away from the frame as the operating member moves from the first position to the second position. The cam follower includes a protrusion that is engaged with the cam groove.

Preferably, the operating member includes an operating portion exposed in a radial direction from at least one of the frame and the cover member, and at least one of the frame and the cover member has a guide part for guiding the movement of the operating portion in accordance with a rotating operation of the operating portion. In this case, since the movement of the operating portion of the operating member is guided by the guide part, it is possible to prevent the operating portion from being tilted with respect to the reel body when the operating portion of the operating member is rotated.

Preferably, the frame includes an opening portion into which the shaft support part is fitted, and the shaft support part includes a fitting portion to be fitted into the opening portion. The dual-bearing reel further includes an elastic member attached to the outer periphery of the fitting portion of the shaft support part. In this case, the shaft support part can be fitted to the frame without looseness.

Preferably, the dual-bearing reel further includes a swinging shaft for swingably supporting the cover member with respect to the frame when the operating member is in the second position. In this case, when the operating member is rotated from the first position to the second position and the shaft support part is detached from the frame, the cover member and the shaft support part can be prevented from falling since the cover member is supported by the swinging shaft.

According to the present disclosure, it is possible to easily remove the cover member from the frame of the reel body in the dual-bearing reel.

BRIEF DESCRIPTION OF THE DRAWINGS

Referring now to the attached drawings which form a part of this original disclosure.

DETAILED DESCRIPTION

[Overall Configuration]

In the following description, when fishing, the direction in which a fishing line is unreeled (cast) is referred to as the "front" and the opposite direction is referred to as the "rear". Further, the term "left and right" indicates the left and right when a dual-bearing reel 100 is viewed from the rear. Also, the term "axial direction" indicates an extending direction of a spool shaft 3 (refer to FIG. 2); the term "radial direction" indicates a direction orthogonal to the spool shaft 3; and the term "circumferential direction" indicates a direction around the axis of the spool shaft 3.

Figure 1:
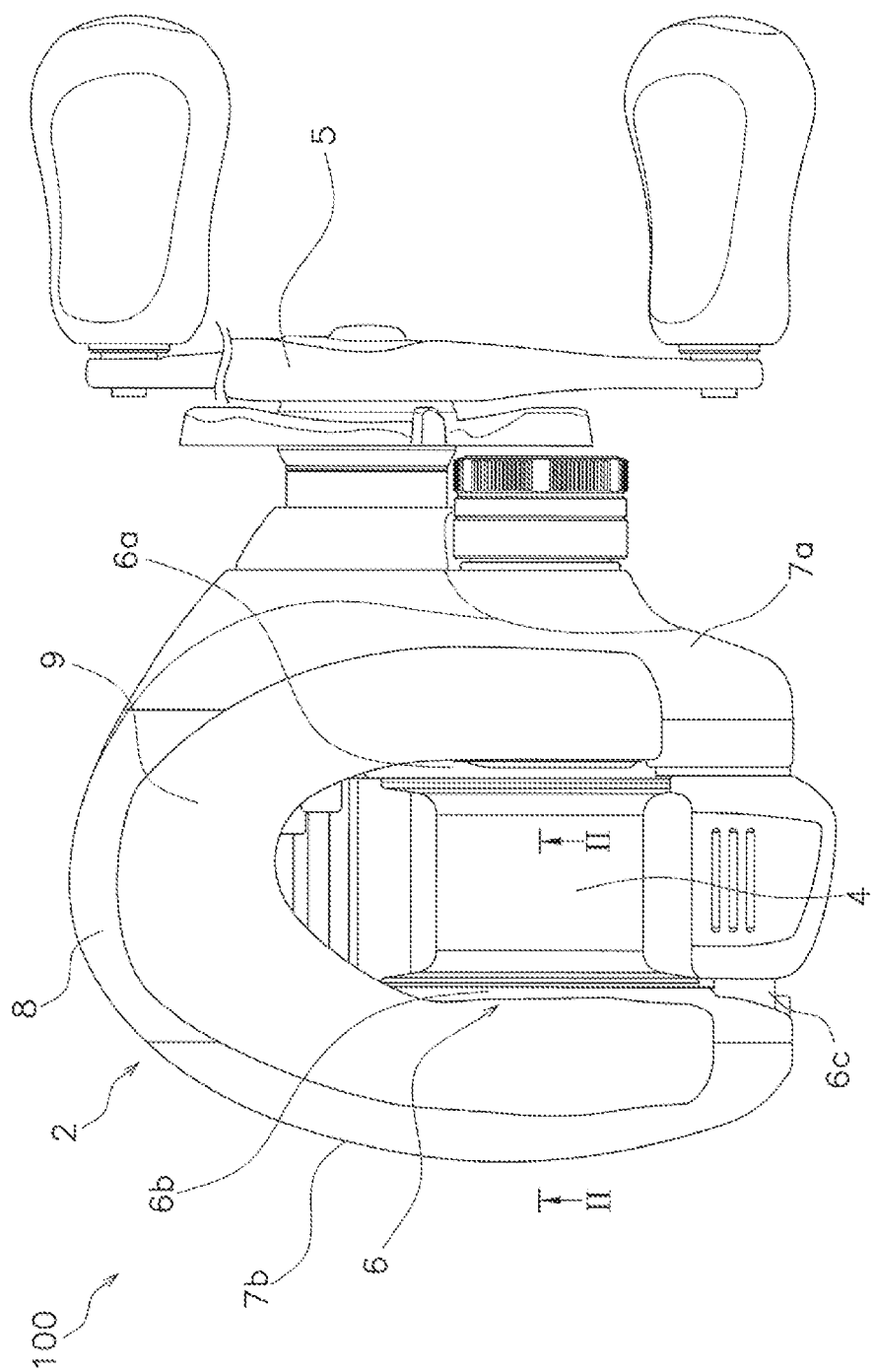
FIG. 1 is a plan view of a dual-bearing reel adopting one embodiment of the present disclosure.
Figure 2:
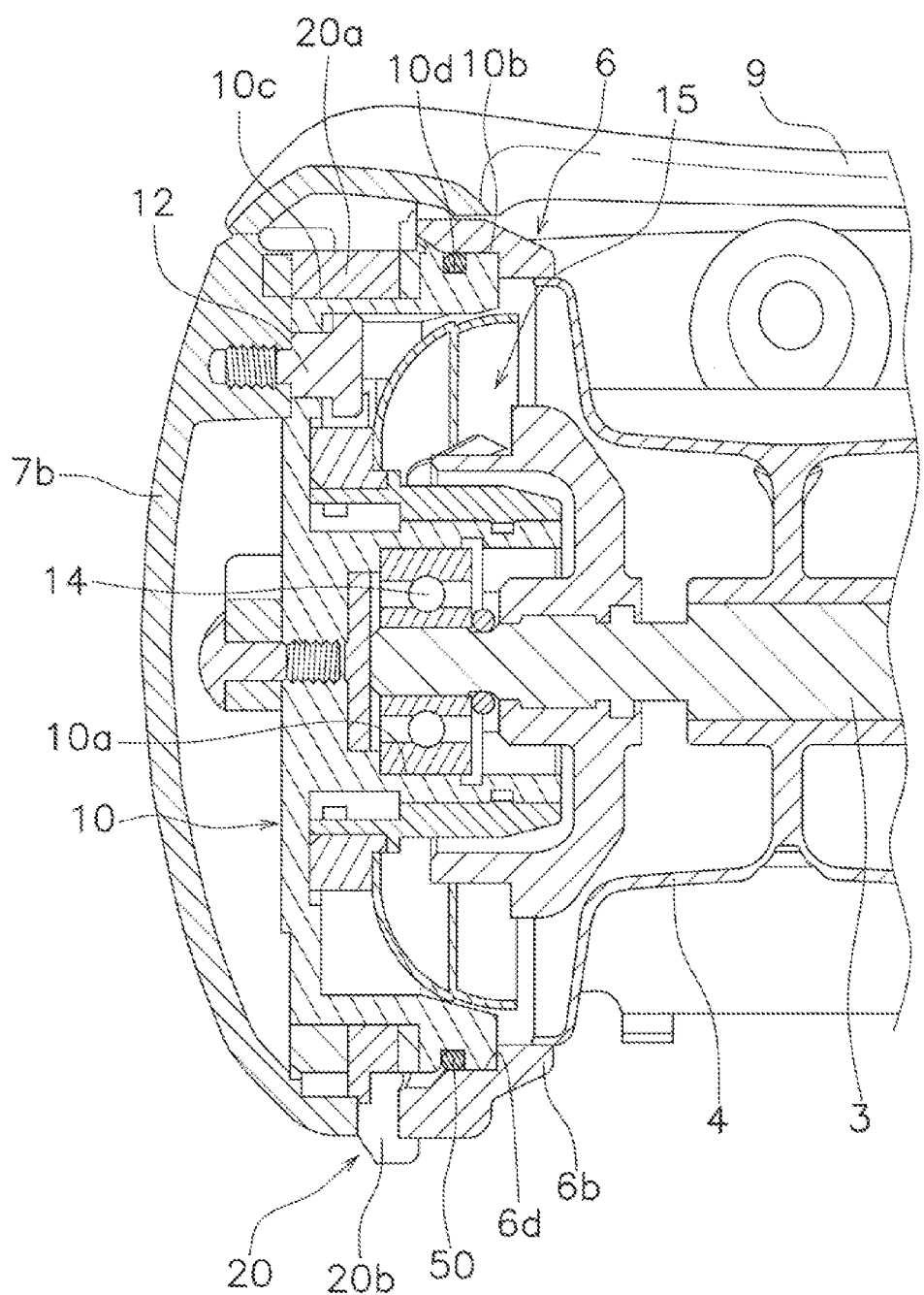
FIG. 2 is a cross-sectional view taken along the line II-II of FIG. 1.
Figure 3:
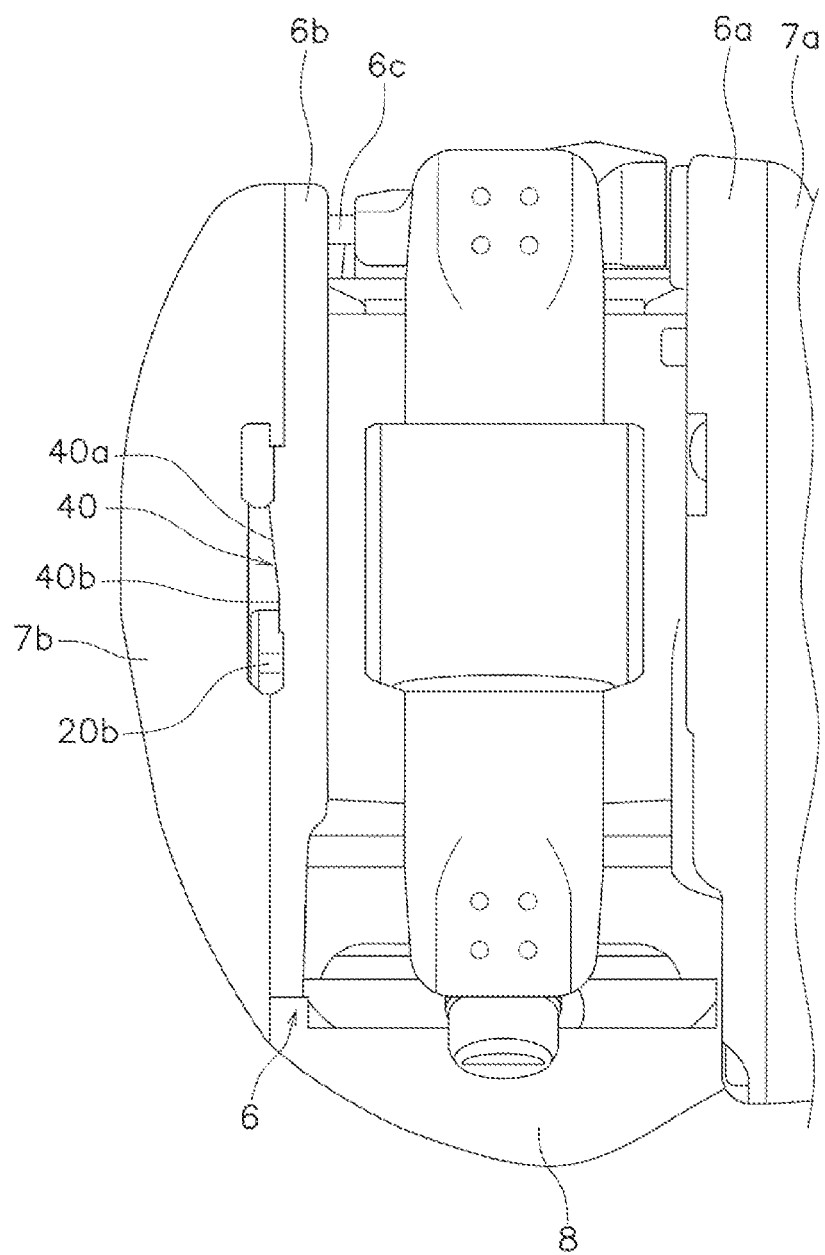
FIG. 3 is a partial bottom view of the dual-bearing reel.

The dual-bearing reel 100 adopting an embodiment of the present disclosure is configured to release a fishing line forward. As shown in FIGS. 1 to 3, the dual-bearing reel 100 includes a reel body 2, a spool shaft 3, a spool 4, a handle 5, an operating member 20, and a cam mechanism 30 (refer to FIG. 5). Preferably, the dual-bearing reel 100 further includes a guide part 40, an elastic member 50, and a swinging shaft 60.

[Reel Body 2]

The reel body 2 includes a frame 6, a first side cover 7a, a second side cover 7b (an example of a cover member), a front cover 8, a thumb rest 9, and a shaft support part 10.

The frame 6 includes a first sideplate 6a, a second side plate 6b, and a plurality of coupling portions 6c.

The first side plate 6a is disposed on the right side of the frame 6. The second side plate 6b is disposed on the left side of the frame 6 spaced apart from the first side plate 6a in the axial direction. As shown in FIG. 2, the second sideplate 6b has a circular opening 6d which opens in the axial direction. A fitting portion 10b (to be described later) of the shaft supporting part 10 is fitted to the opening portion 6d. The plurality of coupling portions 6c extend in the axial direction and couple the first sideplate 6a and the second side plate 6b.

The first side cover 7a is disposed on the right side of the frame 6 and covers the right side of the first side plate 6a of the frame 6. The second side cover 7b is disposed on the left side of the frame 6 and covers the left side of the second side plate 6b of the frame 6. The second side cover 7b is detachably attached to the frame 6 of the reel body 2 via the shaft support part 10.

The front cover 8 is disposed at the front part of the frame 6 and screwed and fixed to the frame 6. The thumb rest 9 is disposed so as to cover the upper part of the frame 6 and is screwed and fixed to the frame 6.

As shown in FIG. 2, the shaft support part 10 is fixed inside of the second side cover 7b and supported by the frame 6. The shaft support part 10 is integrally movable with the second side cover 7b and detachably attached to the frame 6. The shaft support part 10 is fixed to the second side cover 7b by multiple screw members 12.

The shaft support part 10 is a bottomed tubular member and includes a bearing housing portion 10a, a fitting portion 10b, and a rotation supporting portion 10c The bearing housing portion 10a is formed to protrude in a cylindrical shape from the bottom of the shaft support part 10 in the axial direction. A bearing 14 for supporting one end of the spool shaft 3 is accommodated inside the bearing housing portion 10a. A brake mechanism 15 for braking the spool 4 in accordance with the rotation of the spool 4 is disposed on the radially outer side of the bearing housing portion 10a.

The fitting portion 10b has a cylindrical outer peripheral surface and is fitted into the opening 6d of the second side plate 6b. The fitting portion 10b has amounting groove 10d for mounting the elastic member 50. The mounting groove 10d is annular and is recessed in a radially inward direction.

The rotation supporting portion 10c is cylindrical and is disposed on the left side of the fitting portion 10b. The rotation supporting portion 10c is disposed adjacent to the second side cover 7b in the axial direction. The rotation supporting portion 10c rotatably supports the operating member 20. The outer diameter of the rotation supporting portion 10c is formed to be smaller than the outer diameter of the fitting portion 10b.

[Spool Shaft 3]

The spool shaft 3 extends in the axial direction of the reel body 2 and is rotatably supported by the reel body 2. As shown in FIG. 2, one end of the spool shaft 3 is supported by the shaft support part 10 of the reel body 2. More specifically, one end of the spool shaft 3 is supported by the reel body 2 via the bearing 14 disposed in the bearing housing portion 10a of the shaft support part 10. The other end of the spool shaft 3 is supported by the reel body 2 via a bearing (not shown) which is disposed on the reel body 2.

[Spool 4]

The spool 4 is rotatably supported on the reel body 2 between the first side plate 6a and the second side plate 6b. The spool 4 is fixed to the spool shaft 3 and rotates integrally therewith.

[Handle 5]

As shown in FIG. 1, the handle 5 is rotatably disposed on the reel body 2 on the side of the first side cover 7a. The rotation of the handle 5 is transmitted to the spool 4 via a rotation transmission mechanism (not shown). Since the rotation transmission mechanism has the same configuration as a conventional one, an explanation thereof will be omitted.

[Operating Member 20]

The operating member 20 is integrally movable with the shaft support part 10 in the axial direction, and is rotatably attached to the shaft support part 10. In more detail, the operating member 20 is pinched by the second side cover 7b and the fitting portion 10b of the shaft support part 10, and the movement in the axial direction is restricted. The operating member 20 is rotatably supported by the rotation supporting portion 10c of the shaft support part 10. The rotation axis of the operating member 20 is configured to be concentric with the rotation axis of the spool shaft 3.

Figure 4:
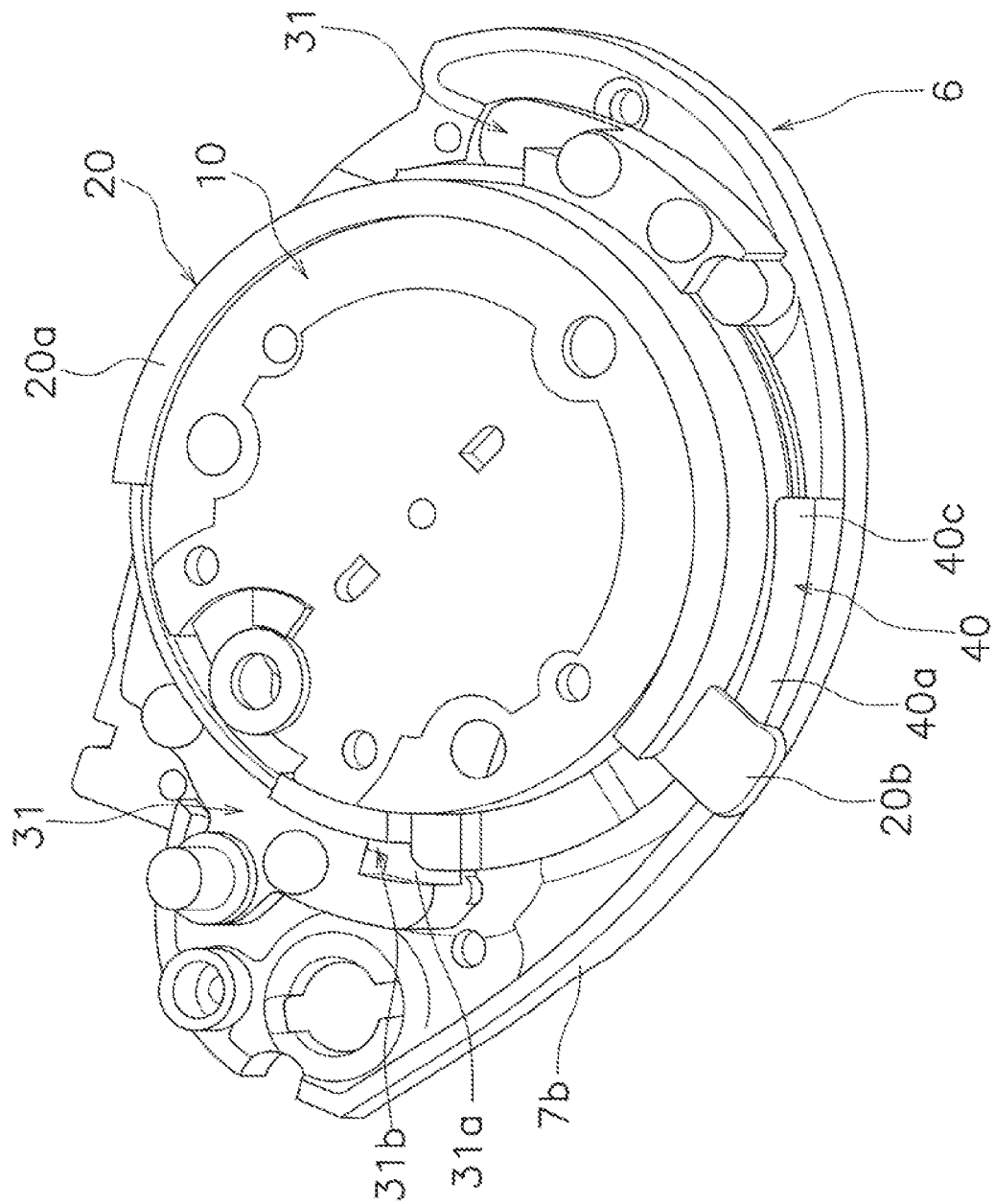
FIG. 4 is a perspective view of a second side plate viewed from the left side when an operating member is in the first position.
Figure 5:
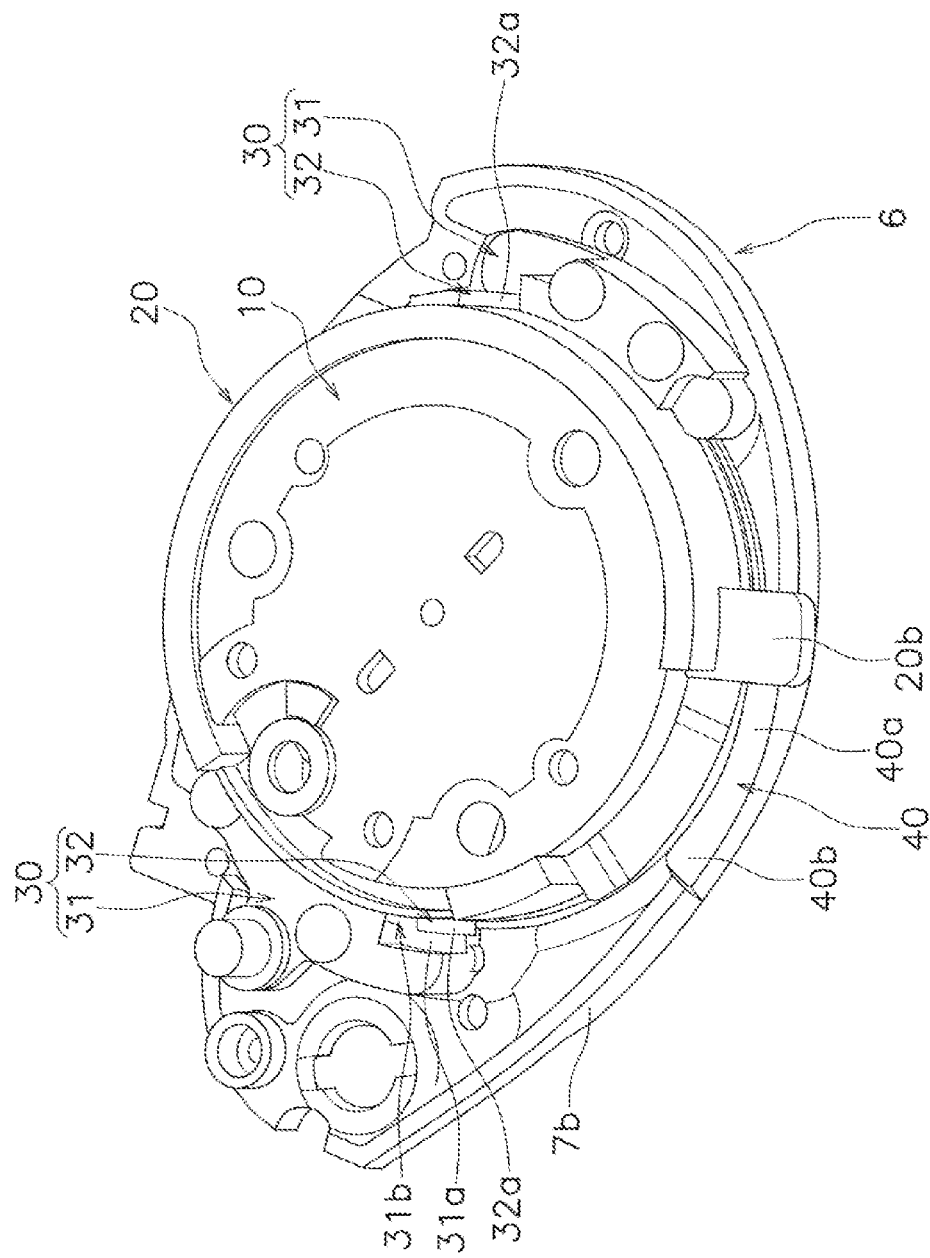
FIG. 5 is a perspective view of the second side plate viewed from the left side when the operating member is in the second position.

The operating member 20 is rotatable between the first position shown in FIG. 4 and the second position shown in FIG. 5. When the operating member 20 is in the first position, the shaft support part 10 is attached to the frame 6. When the operating member 20 is in the second position, the shaft support part 10 is detached from the frame 6.

The operating member 20 includes an annular portion 20a and an operating portion 20b. The annular portion 20a is rotatably mounted on the rotation supporting portion 10c of the shaft support part 10.

The operating portion 20b is exposed in the radial direction from at least one of the frame 6 and the second side cover 7b. In the present embodiment, as shown in FIGS. 2 and 3, the operating portion 20b is exposed radially outward from both the frame 6 and the second side cover 7b. The operating portion 20b is in the form of a lever and is formed so as to protrude radially outward from the outer peripheral surface of the annular portion 20a. The operating portion 20b is provided for operating the rotation of the operating member 20 between the first position and the second position.

[Cam Mechanism 30]

The cam mechanism 30 moves the shaft support part 10 in the axial direction in accordance with the rotation of the operating member 20 so that the shaft support part 10 is attached to and detached from the frame 6.

The cam mechanism 30 includes one or more cams 31 disposed on one of the frame 6 or the operating member 20, and one or more cam followers 32 disposed on the other one of the frame 6 or the operating member 20 so as to be engaged with the cam 31. In the present embodiment, one or more cams 31 are disposed on the frame 6, and one or more cam followers 32 are disposed on the operating member 20. Further, two cams 31 and two cam followers 32 are provided in the present embodiment.

Each of the cams 31 is screwed and fixed to the second side plate 6b of the frame 6 at intervals in the circumferential direction. The cam 31 extends in a circular arc shape and is arranged so that the inner periphery thereof faces the outer periphery of the operating member 20.

Figure 6:
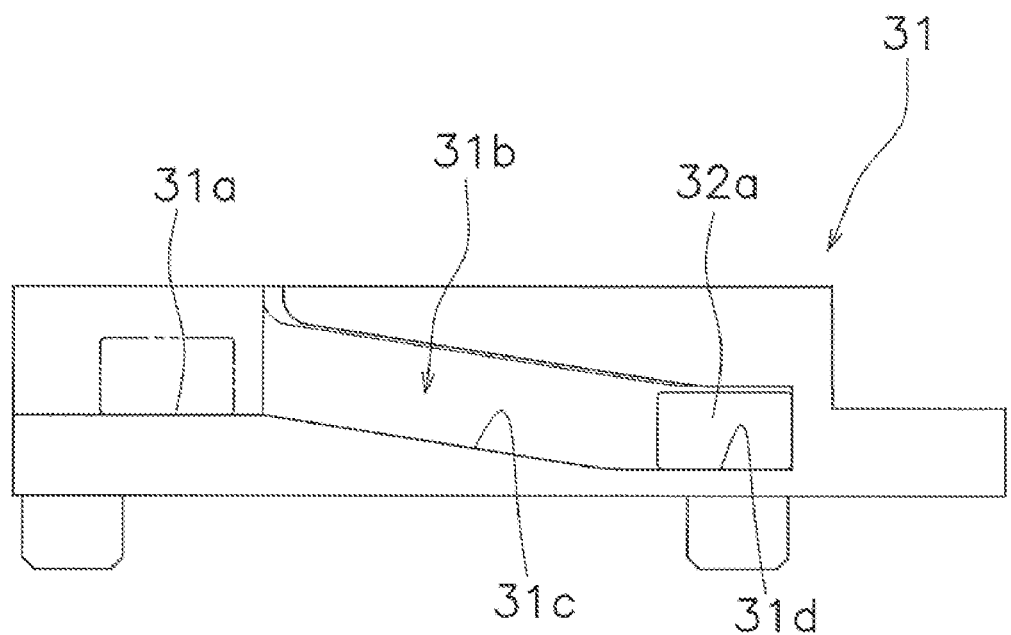
FIG. 6 is a view of a cam as viewed from an inner side in the radial direction.

FIG. 6 is a view of the cam 31 as viewed from the radially inner side. The cam 31 has a first flat portion 31a and a cam groove 31b. The first flat portion 31a is formed flat at one end of the cam 31 along the circumferential direction. The first flat portion 31a is opened axially outward.

The cam groove 31b is formed along the circumferential direction. More specifically, the cam groove 31b further extends in the circumferential direction from the first flat portion 31a and is recessed radially outward from the inner circumferential side. The cam groove 31b has a first inclined portion 31c (an example of an inclined portion) and a second flat portion 31d.

The first inclined portion 31c is inclined so that the shaft supporting part 10 moves in a direction away from the frame 6 as the operating member 20 moves from the first position to the second position. In other words, the first inclined portion 31c is inclined so that the shaft supporting part 10 moves toward the frame 6 as the operating member 20 moves from the second position to the first position.

The second flat portion 31d further extends in the circumferential direction from the first inclined portion 31c and is formed flat along the circumferential direction.

The cam follower 32 has a protrusion 32a that engages with the cam groove 31b of the cam 31. The protrusion 32a protrudes radially outward at a position different from the operating portion 20b of the operating member 20.

As shown in FIG. 6, when the operating member 20 is in the first position, the protrusion 32a is engaged with the second flat portion 31d of the cam groove 31b. When the operating member 20 moves from the first position to the second position, the protrusion 32a passes through the first inclined portion 31c of the cam groove 31b from the second flat portion 31d of the cam groove 31b and moves to the first flat portion 31a of the cams 31. On the other hand, when the operating member 20 moves from the second position to the first position, the protrusion 32a moves from the first flat portion 31a of the cam 31 through the first inclined portion 31c of the cam groove 31b to the second flat portion 31d of the cam groove 31b. When the operating member 20 is in the second position, the protrusion 32a is released from engagement with the cam groove 31b. With this configuration, the protrusion 32a engages with the cam groove 31b and moves in the axial direction, whereby the shaft support part 10 moves in the axial direction together with the operating member 20 provided with the protrusion 32a.

[Action]

In the dual-bearing reel 100 having the above-described configuration, upon rotating the operating member 20 from the first position to the second position, the cam mechanism 30 moves the shaft support part 10 together with the operating member 20 in the direction away from the frame 6, whereby the shaft support part 10 is detached from the frame 6. As a result, it is not necessary to manually move the shaft support part 10 in the axial direction when detaching the shaft support part 10 from the frame 6. Further, even when the shaft support part 10 is fitted to the frame 6 with high accuracy, the shaft support part 10 can be easily detached from the frame 6, and therefore the second side cover 7b can be easily removed from the frame 6.

Further, when attaching the shaft support part 10 to the frame 6, the shaft support part 10 and the second side cover 7b are disposed at predetermined positions with respect to the frame 6, and the operating member 20 is rotated from the second position to the first position. Thus, the shaft support part 10 is moved in the direction towards the frame 6 by the cam mechanism 30, thereby attaching the shaft support part 10 to the frame 6. Therefore, the shaft support part 10 can be easily attached to the frame 6 by performing a rotating operation of the operating member 20.

[Guide Part 40]

The guide part 40 is disposed on at least one of the frame 6 and the second side cover 7b. The guide part 40 guides the movement of the operating portion 20b of the operating member 20 in accordance with the rotating operation of the operating portion 20b. In the present embodiment, the guide part 40 is formed on the second side plate 6b of the frame 6 as shown in FIGS. 3 to 5. The guide part 40 is configured to have a shape conforming to the shape of the cam 31 and is formed along the circumferential direction on the lower side surface of the opening portion 6d of the second side plate 6b.

The guide part 40 includes a second inclined surface 40a, a first flat surface 40b, and a second flat surface 40c. The second inclined surface 40a is formed so as to correspond to the first inclined portion 31c of the cam groove 31b. For example, the inclination angle and the circumferential length are equal to the inclination angle and circumferential length of the first inclined portion 31c of the cam groove 31b.

The second inclined surface 40a is formed inclined so as to guide the movement of the operating portion 20b of the operating member 20 in the direction away from the spool 4 as the operating member 20 moves from the first position to the second position. In other words, the second inclined surface 40a is formed inclined so as to guide the movement of the operating portion 20b of the operating member 20 toward the spool 4 as the operating member 20 moves from the second position to the first position.

The first flat surface 40b extends flatly in the circumferential direction from one end of the second inclined surface 40a and supports the operating portion 20b of the operating member 20 in the axial direction when the operating member 20 is in the first position.

The second flat surface 40c extends flatly in the circumferential direction from the other end of the second inclined surface 40a and supports the operating portion 20b of the operating member 20 in the axial direction when the operating member 20 is in the second position.

By providing the guide part 40 as described above, when the operating portion 20b of the operating member 20 is rotated, the operating portion 20b of the operating member 20 is supported by the guide part 40. This configuration makes it possible to prevent the operating portion 20b from being tilted with respect to the reel body 2 when the operating portion 20b of the operating member 20 is rotated.

[Elastic Member 50]

As shown in FIG. 2, the elastic member 50 is attached to the outer periphery of the fitting portion 10b of the shaft support part 10. In the present embodiment, the elastic member 50 is attached to the mounting groove 10d of the shaft support part 10. The elastic member 50 is an elastic body made of an elastically deformable resin or the like, and is, for example, an O ring. The location of the elastic member 50 between the frame 6 and the shaft support part 10 allows the shaft support part 10 to be fitted to the opening portion 6d of the frame 6 without rattling. Further, in the present embodiment, even in a case where the elastic member 50 is provided to firmly fit the shaft support part 10 and the frame 6, the shaft support part 10 can be easily detached from the frame 6 since the shaft support part 10 can be attached to and detached from the frame 6 by rotating the operating member 20.

[Swinging Shaft 60]

Figure 7:
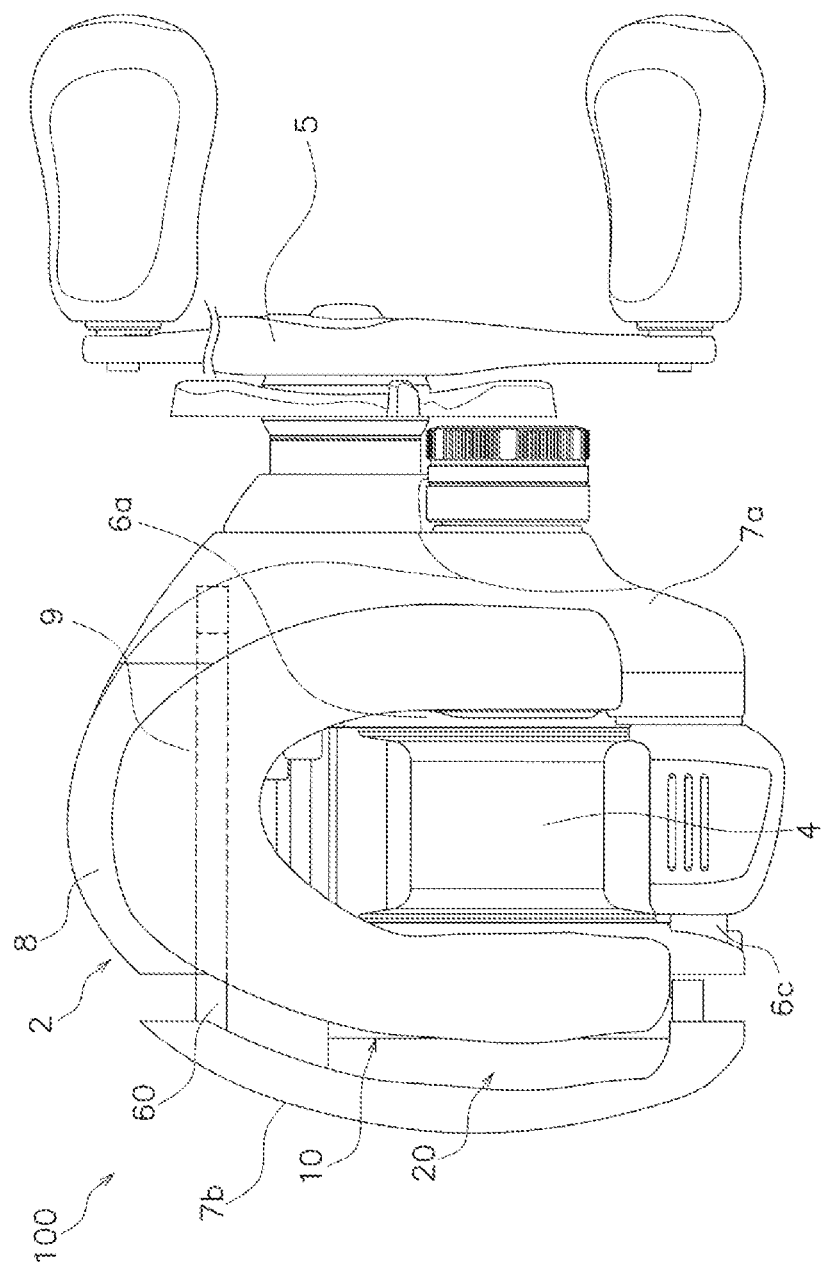
FIG. 7 is a plan view showing a state in which a cover member is detached from a reel body.

As shown in FIG. 7, the swinging shaft 60 supports the second side cover 7b swingably with respect to the frame 6 when the operating member 20 is in the second position. The swinging shaft 60 is supported on the reel body 2 to be rotatable and movable in the axial direction. With this configuration, it is possible to prevent the second side cover 7b and the shaft support part 10 from falling when the shaft support part 10 is detached from the frame 6 by rotating the operating member 20 from the first position to the second position.

Other Embodiments

One embodiment of the present disclosure has been described above; however, the present disclosure is not limited to the above embodiment, and a variety of changes can be made without departing from the scope of the present disclosure. In particular, a plurality of embodiments and modifications described in the present specification can be arbitrarily combined on an as-needed basis.

(a) In the above embodiment, the second side cover 7b covering the left side of the reel body 2 is exemplified as a cover member; however, the first side cover 7a covering the right side of the reel body 2 can be configured as a cover member. In this case, the handle 5 is disposed on the side of the second side cover 7b.

(b) In the above embodiment, the guide part 40 is disposed on the frame 6. However, a configuration can be adopted in which the guide part 40 is disposed on the second side cover 7b or disposed on both the frame 6 and the second side cover 7b so as to guide the movement of the operating portion 20b of the operating member 20.

What is claimed is:

1. A dual-bearing reel, comprising:
a reel body including a frame, a cover member disposed on one side of the frame, and a shaft support part fixed inside of the cover member and supported by the frame;
a spool shaft having one end supported by the shaft support part;
an operating member integrally movable with the shaft support part in an axial direction of the spool shaft, the operating member rotatably mounted on the shaft support part to rotate between a first position where the shaft support part is attached to the frame and a second position where the shaft support part is detached from the frame; and
a cam mechanism configured to move the shaft support part in the axial direction in accordance with rotation of the operating member such that the shaft support part is attached to and detached from the frame.

2. The dual-bearing reel according to claim 1, wherein the cam mechanism includes one or more cams disposed on one of the frame or the operating member, and one or more cam followers disposed on the other one of the frame or the operating member to be engaged with the cam.

3. The dual-bearing reel according to claim 2, wherein each of the one or more cams is formed along a circumferential direction and includes a cam groove having an inclined portion that moves the shaft support part in a direction away from the frame as the operating member moves from the first position to the second position, and
each of the one or more cam followers includes a protrusion to be engaged with the cam groove.

4. The dual-bearing reel according to claim 3, wherein the operating member includes an operating portion exposed in a radial direction from at least one of the frame and the cover member, and
at least one of the frame and the cover member includes a guide part configured to guide movement of the operating portion in accordance with a rotating operation of the operating portion.

5. The dual-bearing reel according to claim 4, wherein the protrusion of each of the one or more cam followers protrudes radially outward at a position different from the operating portion of the operating member.

6. The dual-bearing reel according to claim 3, wherein each of the one or more cams further includes a first flat portion and a second flat portion whose dimension in the axial direction is smaller than that of the first flat portion, and
the inclined portion connects the first flat portion and the second flat portion.

7. The dual-bearing reel according to claim 1, wherein the frame includes an opening portion into which the shaft support part is fitted,
the shaft support part includes a fitting portion to be fitted into the opening portion, and further includes an elastic member attached to an outer periphery of the fitting portion of the shaft support part.

8. The dual-bearing reel according to claim 1, further comprising
a swinging shaft configured to swingably support the cover member with respect to the frame when the operating member is in the second position.

9. The dual-bearing reel according to claim 1, wherein the operating member includes an annular portion rotatably mounted on the shaft support part, and an operating portion which protrudes radially outward from an outer peripheral surface of the annular portion.

* * * * *